United States Patent [19]
Schneider

[11] 3,904,185
[45] Sept. 9, 1975

[54] APPARATUS FOR SIMULTANEOUSLY FABRICATING A PLURALITY OF WALL FRAME PLATES

[76] Inventor: Fredric H. Schneider, 4521 Merrill Ave., Oakland, Calif. 94619

[22] Filed: June 1, 1973

[21] Appl. No.: 366,081

[52] U.S. Cl. ............... 269/291; 33/76 R; 269/295; 269/319; 269/321 F
[51] Int. Cl.² ........................................ B23Q 3/00
[58] Field of Search .......... 33/32 R, 32 C, 76 R, 81, 33/138; 83/467, 468; 144/228 C; 269/291, 295, 208, 297, 298, 299, 300, 301, 319, 321 R, 321 F, 315

[56] References Cited
UNITED STATES PATENTS

| | | | |
|---|---|---|---|
| 1,485,149 | 2/1924 | Renken | 83/467 X |
| 2,112,789 | 3/1938 | Ross | 269/315 |
| 2,840,914 | 7/1958 | Bucklew | 33/138 X |
| 3,124,181 | 3/1964 | Clemans | 269/315 |
| 3,744,134 | 7/1973 | Zima | 33/138 |

*Primary Examiner*—Roy Lake
*Assistant Examiner*—Mark S. Bicks
*Attorney, Agent, or Firm*—C. Michael Zimmerman, Esq.

[57] ABSTRACT

Apparatus is described for simultaneously fabricating a plurality of wall frame plates. The apparatus includes a table providing a generally horizontal wall plate fabrication area having a carriage track extending lengthwise thereof adjacent one edge. A carriage rides on the track for adjustable positioning lengthwise of the fabrication area, which carriage includes either a lumber stop projecting over the fabrication area for engagement with the ends of lumber to position the same for the formation of wall plates therefrom or a marker having a straight edge projecting over the fabrication area for transferring indicia to wall plates.

7 Claims, 8 Drawing Figures

3,904,185

APPARATUS FOR SIMULTANEOUSLY FABRICATING A PLURALITY OF WALL FRAME PLATES

BACKGROUND OF THE INVENTION

The present invention relates to the construction of wooden frame buildings and, more particularly, to apparatus for simultaneously fabricating a plurality of frame wall plates of a desired length.

In the construction of multiple living units, such as apartment buildings and tract housing, many of the walls are of the same length and sometimes duplicates of one another. Much of such construction is wooden frame construction, i.e., the walls include interior supporting frames of wood. It will be appreciated that in order to reduce the overall wall fabrication time, it is desirable to be able to form the plates (upper and lower horizontal members) for the similar wall frames at the same time.

SUMMARY OF THE INVENTION

The present invention provides apparatus for simultaneously fabricating the wall plates for a plurality of wall frames of the same length. In this connection, the apparatus enables the formation at one time of not only the main wall plates, but also the so-called "doubler plates" which are generally of a predetermined greater length to overlap the main wall plates and tie the frames of abutting walls together. In its basic aspects, the apparatus includes means, such as a table surface, which defines a generally planar fabrication area having a length dimension at least equal to the desired length for the plurality of wall plates. A positioning carriage rides on a carriage track which extends lengthwise of such fabrication area. The carriage is adapted to position the end of lumber which is to be formed into wall plates and is adjustably positionable along the track to enable it to be properly positioned to define the location for the end of lumber pieces so that they can be cut to the appropriate length desired for the plurality of wall plates.

A template for defining the lengths desired for the plurality of wall plates extends lengthwise of the fabrication area adjacent the track. As a particularly salient feature of the instant invention, the template includes mechanical locator elements along its length which are spaced therealong distances representative of desired lengths for wall plates, and the carriage includes indexing means which mechanically interacts with such locator elements on the template to properly position the carriage along the track at locations determined by the template. In this manner, the necessity of measuring or visually checking the position of the carriage is obviated. That is, a worker utilizing the apparatus need only move the carriage along the track to a position at which the carriage index engages the locator elements to properly position the carriage for a desired wall plate length.

Most desirably, the spacing along the template between each successive pairs of the locator elements represents a different one of the various lengths desired for wall plates. The fabrication apparatus can then be converted from the formation of templates of one length to that of another merely by advancing the template across the fabrication area and adjusting the position of the carriage as determined thereby. In this connection, it is desirable that the template be flexible along its lengthwise direction and have its opposite end portions respectively coiled about spools on the opposite ends of such fabrication area so that advancement of the template across the layout area is simply accomplished by appropriately rotating the spools to feed the template from one to the other.

Most desirably, the location of the lumber stop portion of the carriage is adjustable relative to the remainder of the carriage, so that wall plates of a predetermined length which is different but associated with the length represented by the template can be made without the necessity of moving either the carriage or the template. More specifically, the lumber stop portion of the carriage is adjustable relative to the remainder of the carriage for the formation of doubler plates. In one preferred embodiment, the lumber stop includes a pair of sections which are adjustable with respect to one another in order to enable the simultaneous fabrication of wall plates of the length desired by the template and wall plates of an additional, associated length, such as doubler plates.

The invention includes other features and advantages which will be described or will become apparent from the following, more detailed description.

BRIEF DESCRIPTION OF THE DRAWINGS

With reference to the accompanying three (3) sheets of drawing.

DETAILED DESCRIPTION OF THE PREFERRED EMBODIMENTS

Figures 1, 2:
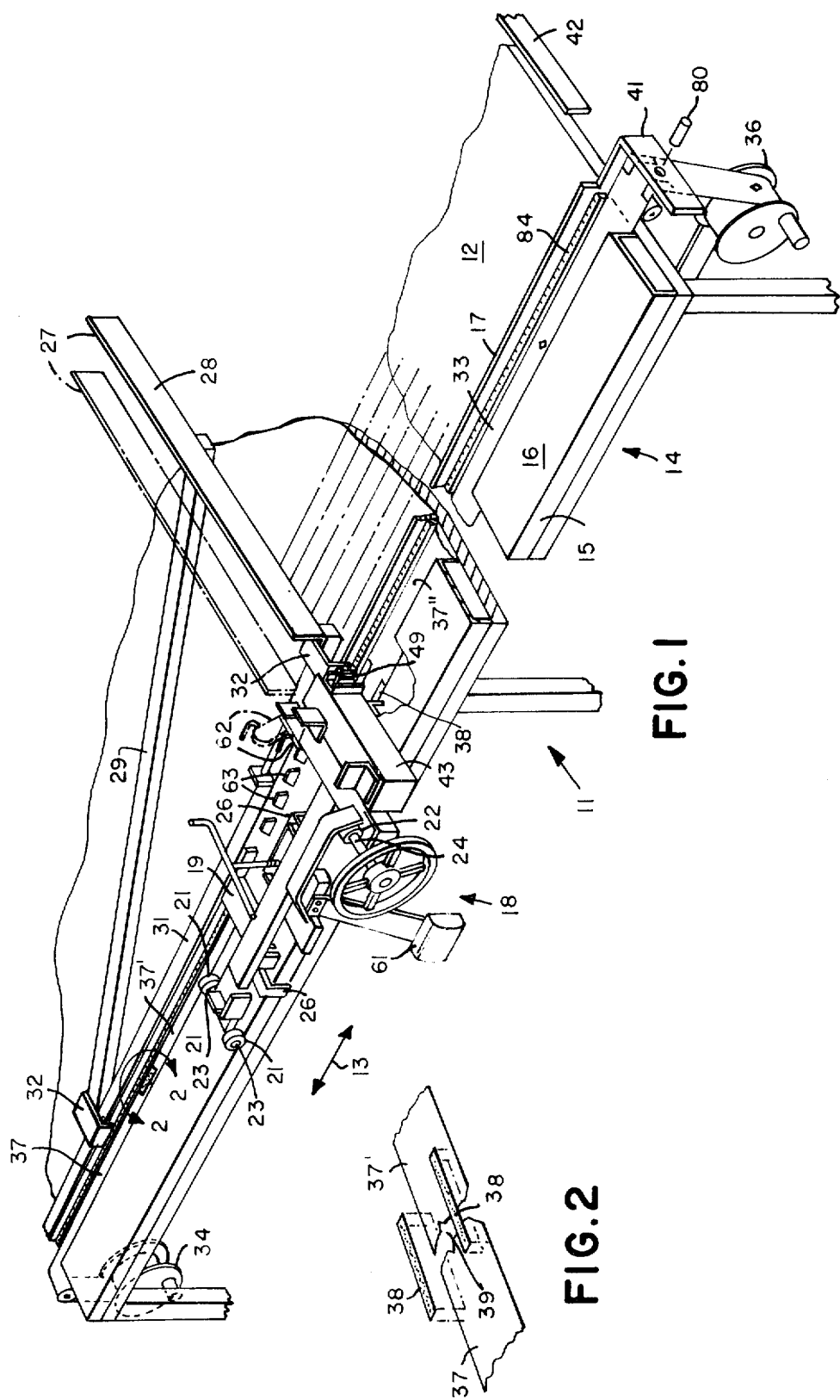
FIG. 1 is a partial and broken away perspective view of a preferred apparatus of the invention for simultaneously forming a plurality of wall frame plates.
FIG. 2 is a perspective partial and exploded view taken at the circled portion of FIG. 1 of the template of the invention.

Reference is first made to FIGS. 1 through 4 of the accompanying sheets of drawing which show a preferred embodiment of the invention for simultaneously forming a plurality of wall plates. As is best seen from FIG. 1, the apparatus of the invention includes a table 11 defining an upper horizontal surface providing a fabricating area 12. The length dimension of the fabricating area, i.e., that dimension extending in the direction of arrow 13, should be equal at least to the length desired for the longest wall plate to be fabricated thereon. The width of such table should be sufficient to accommodate widthwise the number of wall plates to be simultaneously formed. In this connection, the features of the instant invention can be incorporated into the wall frame prefabrication apparatus described in my U.S. Pat. No. 3,680,617, to enable both the simultaneous formation of a plurality of wall plates as described herein and the prefabrication of complete wall frames as described in such patent, on the same table. When the invention is so incorporated, the fabrication area 12 shown in FIG. 1 will be the same as the layout area described in such patent for the prefabrication of wall frames.

A track, generally referred to by the reference numeral 14, for directing movement of a carriage as will be described extends lengthwise of the fabrication area. More particularly, a U-shaped channel 15 is inverted and provided on the fabrication area adjacent one side edge thereof. As can be seen, the channel 15 thus provides a flat surface 16 elevated slightly above the fabrication area upon which a carriage can ride. The track 14 further includes an upwardly extending flange 17 which is spaced inwardly of the fabricating area 12 from the channel 15 and extends lengthwise of such fabricating area parallel to such channel. As will be described, such flange cooperates with the channel 15 in guiding movement along the track.

The carriage, generally referred to by the reference numeral 18, includes a base 19 to which rollers 21 and 22 are rotatably mounted respectively via axles 23 and 24 as illustrated. Rollers 21 and 22 thus support the carriage on the track surface 16 for movement longitudinally therealong. Guides in the form of depending flanges, two of which are shown in FIG. 1 and referred to by the reference numeral 26, are secured to the base 19 of the carriage and engage opposite sides of the channel 15 to guide the movement of the carriage base along the track.

Carriage 18 further includes a lumber stop detachably secured thereto which projects from base 19 over the fabricating area for engagement with the ends of lumber, to thereby position such lumber for the fabrication of wall plates therefrom. That is, an angle iron bar 27 presenting an abutment face 28 extends from the carriage base in a direction normal to the track 16 over the fabricating area. The free end of such bar is supported from the carriage via a brace 29 which extends between such bar and the free end of an extension 31 projecting rearwardly from the carriage base 19. Angle iron guides 32 project from the extension 31 across the guide flange 17 and downwardly as illustrated to thereby maintain extension 31 adjacent such guide flanges and provide proper guiding of arm 27 along the track as the carriage moves.

Means are also provided for indicating the proper position of the carriage 18 to enable fabrication of plates of a desired length. That is, a template 33 indicative of a desired length for a plurality of wall plates extends lengthwise of the fabrication area adjacent the carriage track, i.e., between U-channel 15 and flange 17. Most desirably, the template 33 is an elongated slat which includes representations of a plurality of differing length wall plates successively along its length. Such template is flexible in its lengthwise direction, and the table 11 includes spools 34 and 36 respectively at opposite ends of the fabrication area about which such template is coilable. As is illustrated, the template extends across the fabrication area and has its opposite end portions coiled about the respective spools. Thus, successive zones of the template sections indicative of differing wall plate lengths can be located on the fabrication area, merely by rotating the spools 34 and 36 to advance the template across such fabrication area.

The template 33 is most desirably provided as successive, discrete pieces of thin metal slat, each of which pieces represents one of the desired wall plate lengths. As can be seen from FIG. 1, adjacent ends of the pieces or sections 37, 37' and 37'' are joined by strips of adhesive tape 38 or the like. FIG. 2 illustrates in more detail the manner in which such adjacent sections are joined. For reasons which will become apparent hereinafter, the adjacent sections 37 of the template are not abutted tightly against one another when they are joined, but rather are spaced a small distance from one another to thereby define a slot or hole 39 therebetween.

As best illustrated in FIG. 2, each template slat section 37 includes a slight curvature in its transverse cross-section, which curvature tends to maintain the slat in a flat condition but which is overcomable by the spools in coiling the same.

Means are also provided for positioning each section 37 of the template at the proper location lengthwise across the fabrication area for indicating a plate length represented thereby. That is, an abutment plate 41 extends across the path of the template adjacent the front end of the fabrication area. As can be seen from FIG. 1, each section of the template, such as the section 37'', will tend to maintain its flat condition the short distance beyond the front edge of the table 11 to the abutment plate 41. The template will not maintain its flat condition, however, at locations at which adjacent sections are secured together with an adhesive tape. Thus, as illustrated, the end of a section representative of a desired wall plate length can be abutted against the abutment plate 41 to define a predetermined position of such template relative to the fabrication area.

Means are provided for guiding a saw transversely across the fabrication area in alignment with the end of a template section abutted against plate 41. More particularly, a saw guide rail 42 is suitably supported in alignment with the abutment face of plate 41. While the particular guide rail 42 is designed for the guidance of a hand-held electric saw, it will be appreciated that guide arrangements for other types of saws could also be provided. For example, in a permanent installation, it may be desirable to use a radial arm saw for cutting of the wall plates to length. The guide would then take the form of a radial arm of such a saw.

Figure 3:
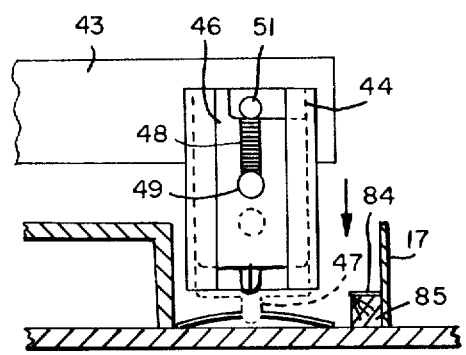
FIG. 3 is an enlarged cross-sectional view illustrating the carriage indexing mechanism of the preferred apparatus of FIG. 1 and its relationship to the template.

As a particularly salient feature of the instant invention, means are provided for simply and quickly positioning the carriage 18 at the required location on the track for defining the required position of the end of the lumber pieces so that when they are cut, the resulting plates will be of the length indicated by the template. More particularly, the slots or holes 39 provide mechanical locator elements spaced distances along the template representative of the desired wall plate lengths. For example, the distances between the pair of holes 39 respectively at the opposite ends of the template section 37'' represent a desired length for a first plurality of wall plates, and the distance between the pair of holes 39 at the opposite ends of the template section 37' represent a different desired length for a second plurality of wall plates. The carriage includes indexing means which mechanically engage such locator slots or holes 39 to thereby enable accurate positioning of such carriage without the necessity of making visual alignment, for example, of such carriage with a mark. In more detail, the carriage 18 includes a support block 43 which extends over the location of the template for movement therealong with the carriage. As best shown in FIG. 3, a guide casing 44 depends downwardly from block 43 and slideably supports a slide plate 46. Slide plate 46 terminates at its lower end in a projection 47 which is sized to engage within the locator hole 39 formed between adjacent sections 37 of the template. A tension spring 48 connected between pin 48 on the plate and pin 51 on the guide imparts a slight tension tending to normally maintain the plate in its upper, withdrawn position from the template, as illustrated in solid in FIG. 3. The slide 46 is moveable to its downward position in engagement with the template by applying a slight downward pressure to pin 49, for example. In this connection, it should be noted that the tension provided by spring 48 is so slight that when the projection 47 of such slide is engaged within a locator hole 39, the friction between such projection and the locator hole edges will tend to maintain such slide in its downward position. It will be further noted that because the central portion of the template is bowed outward relative to its side edges as viewed in transverse crosssection, and the locator holes extend centrally therethrough along its length, the projection 47 actually extends through the template and terminates beyond its underneath side to thereby provide firm engagement of such projection with such template in the locator holes.

The simple manner in which the proper location along the track for the carriage is determined by the template is apparent. More particularly, once a template section representative of a desired plate length is advanced across the prefabrication area and properly positioned in location by having its forward end abut against abutment plate 41, the worker need only move carriage 18 forwardly or rearwardly, as the case may be, on the track while applying downward pressure to index slide 46 until such time as the index projection 47 engages the locator hole in template 33.

Figure 4:
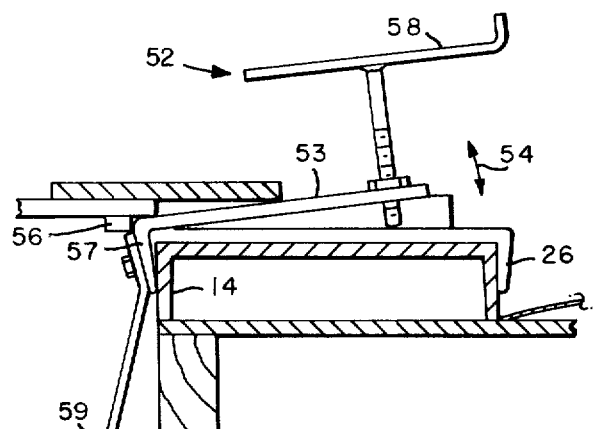
FIG. 4 is an enlarged cross-sectional view of a portion of the apparatus of FIG. 1 illustrating the manner in which the carriage is locked into a selected position on the carriage track.

Means are provided for locking the carriage in position on the track if it is desired to do so to assure that the position of the same will not be unintentionally changed during the plate formation operation. That is, as best shown in FIG. 4 of the drawing, a lever vise mechanism 52 cooperates with one of the guide flanges 26 to provide the desired locking. Mechanism 52 includes a lever 53 which is pivotally supported on the base of the carriage for limited arcuate movement in the direction of arrow 54. Such movement will cause a corresponding movement of a flange or jaw 57 on the free end of lever 53 toward and away from track channel 15. In this connection, a stop block 56 is provided on the carriage base to prevent translational movement of the jaw 57 away from the track channel. Thus, upward movement of the end of lever 53 opposite jaw 57 will result in channel 15 being grasped between the jaw 57 and the guide flange 26 opposite thereof. A crank operated bolt 58 threadably received through the free end of lever 53 engages the carriage so that upon rotation thereof, lever 53 is pivoted to either engage or release channel track 15, depending upon the direction of rotation of such bolt 58.

The locking means further includes means for temporarily or selectively locking carriage in a predetermined position on the track, rather than in a more permanent fashion such as is effected when the crank 58 is utilized. That is, an actuator lever 59 for the lever vise mechanism 52 has one end secured to the jaw 57, and a resilient pad 61 on its free end. It will be seen that the application of pressure on the pad 61 will cause lever 59 to respond by causing jaw 57 to press against channel 15 and thereby squeeze the same between itself and guide flange 26. Thus, because the fabrication area is normally at waist height, a worker is in a position to use his leg to temporarily lock the carriage in a desired position on the track. Although there may be times during the cutting of plates to lengths at which it is desirable to provide such temporary locking of the carriage in position, this feature of the invention is particularly useful in connection with transferring markings from a template to plates as will be described hereinafter.

In the construction of living units, it is often desirable that abutting wall frames be tied together via so-called "doubler" plates. That is, it is often necessary that in addition to the regular plates for a wall frame, additional plates be provided of a predetermined longer length to be secured to the regular plates and overlap onto a wall frame against which the frame with which they are associated is to be abutted. The apparatus of the invention includes means for simply providing such additional wall plates of an associated length without the necessity of either having to provide separate templates therefor or moving the carriage 18 on the carriage track. More particularly, means are provided for selectively adjusting the location of the angle bar 27 lengthwise of the fabrication area relative to the carriage. That is, with reference to FIG. 1, the mechanical connection between the lumber stop assembly, made up of the lumber stop 27, brace 29, extension 31, and guides 32, and the base of the carriage is simply via a lever 62 which is pivotally mounted on the lumber stop for selective engagement within any one of a plurality of slots which are defined lengthwise of the carriage by upwardly projecting teeth 63. Thus, the location of the lumber stop can be varied relative to the carriage from the position illustrated in which the lumber stop is aligned with the template locator hole when the carriage indexing projection is engaged with such locator hole, to any one of the slot positions rearwardly thereof defined by the teeth 63. The distance between each of the slot positions preferably equals about one-half of a wall frame width so that by appropriately choosing a slot for moving the stop relative to the carriage, a workman can automatically obtain a desired positioning of the lumber relative to saw guide 42 to enable the fabrication of additional plates having a length which is a multiple of half wall widths of the primary plates. Doubler plates having a length desired to provide an overlap on either or both ends of the wall can thus be simply provided without special measurement.

Figure 5:
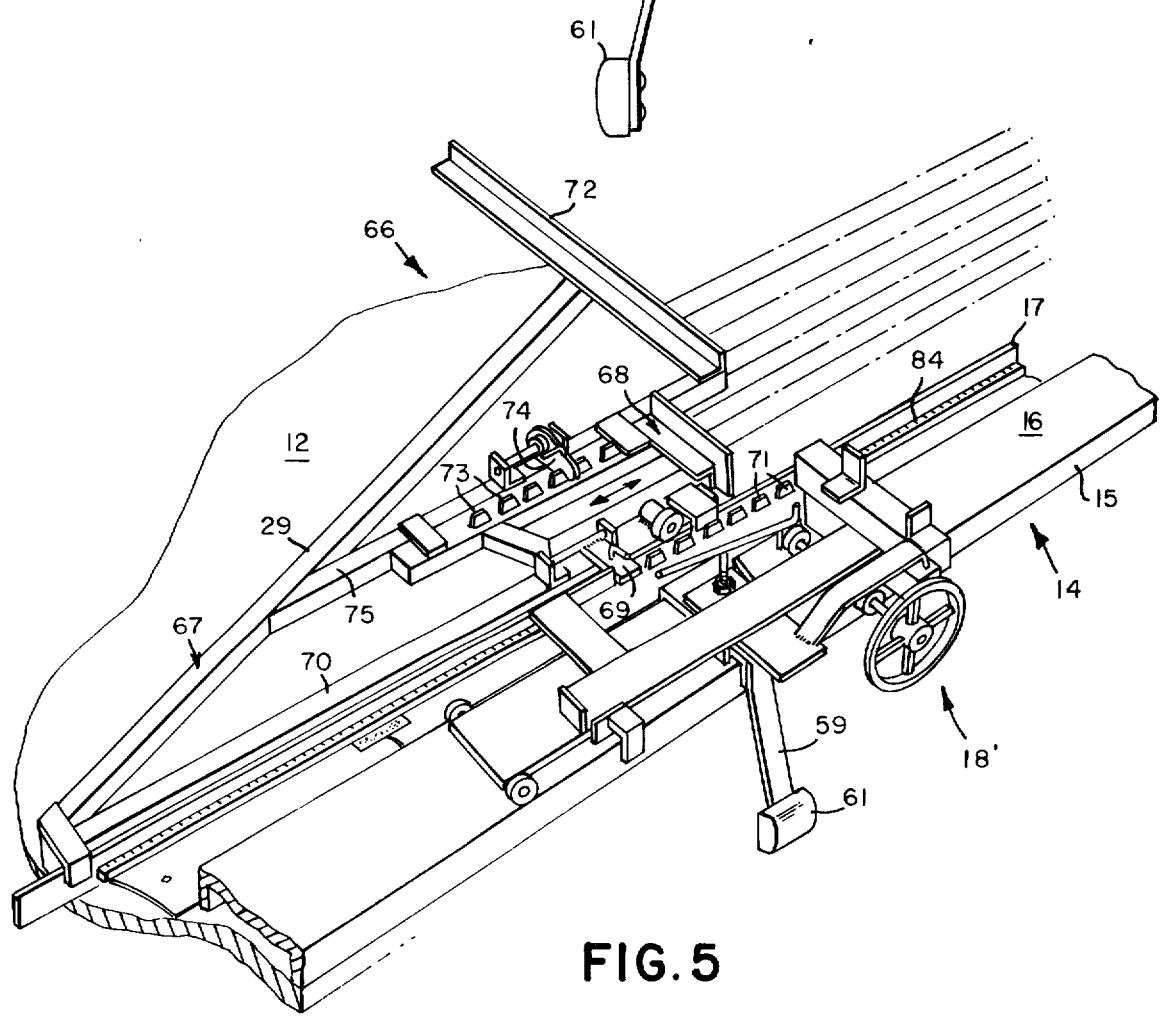
FIG. 5 is a perspective view of another embodiment of the invention in which the lumber stop portion of the carriage includes a pair of lumber end positioning sections.

In some construction operations, it is known that a major number of the walls to be provided are to include doubler plates. FIG. 5 illustrates an alternate embodiment of the invention in which the lumber stop is adapted to enable the cutting of such doubler plates simultaneously with the cutting of the regular wall plates. More particularly, it will be seen that the lumber stop 66 includes a pair of stop sections 67 and 68 respectively. The section 67 includes a lever 69 which is pivotally mounted on frame piece 70 for engagement with the rear one of the slots defined by the upwardly projecting teeth 71 on the carriage. When such lever is so engaged, the abutment face of the stop bar 72 is properly aligned with the template locator hole engaged by the carriage. The section 68 is slidable within the section 67 and includes a plurality of teeth 73 which are engageable by a second lever 74 on frame piece 75 of section 67. In all other important respects, the apparatus of FIG. 5 is the same as that of the earlier described embodiment. Thus, like parts referred to by like reference numerals in both embodiments.

It will be recognized that the arrangement of FIG. 5 enables the positioning of the section 68 to be adjusted for doubler plates relative to the carriage and the abutment face of stop bar 72 of section 67. Thus, lumber pieces to be cut for the doubler plates can be abutted against the stop section 68 whereas lumber pieces to be cut for the regular plates can be abutted against the stop 67. One saw cut at the guide at the opposite end of the fabrication area will thus simultaneously provide both the doubler plates and the regular plates.

Figure 6:
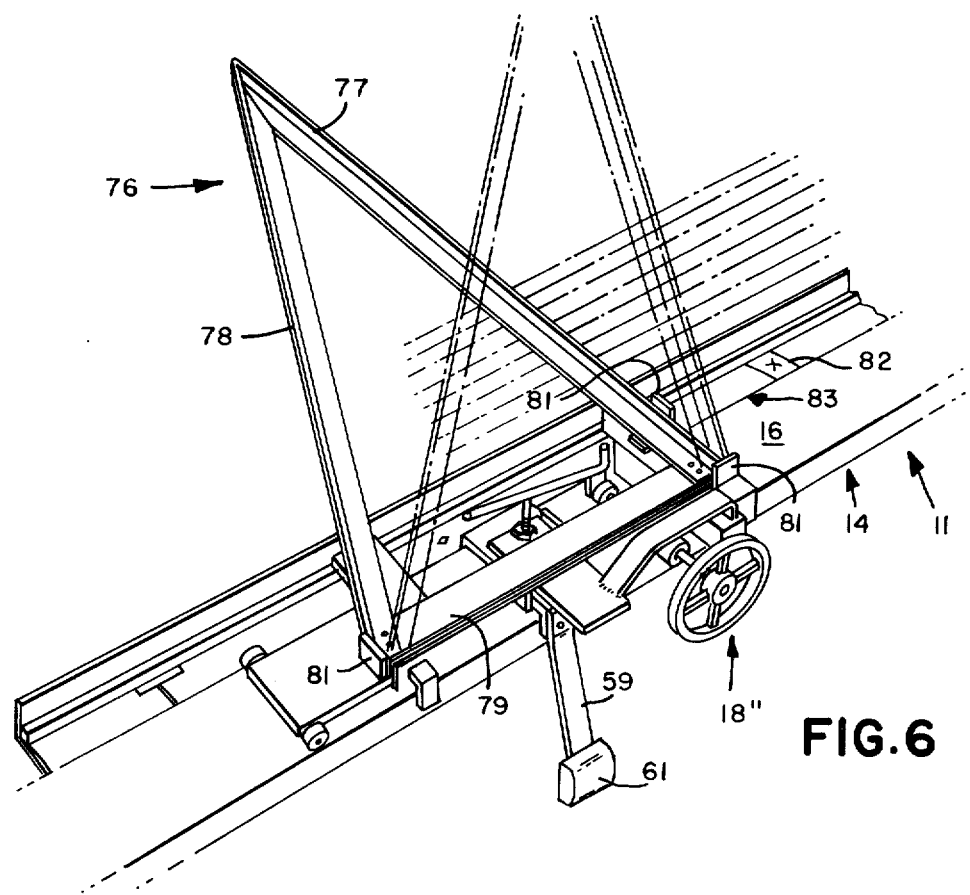
FIG. 6 is a perspective view of a third embodiment of the invention in which a plate marker is associated with the carriage.

Although the carriage of the invention is particularly useful in providing a lumber stop for positioning the ends of lumber pieces to be made into wall plates, it is also useable for other functions in connection with the formation of plates. For example FIG. 6 illustrates the carriage in combination with a marker for transferring indicia on a template to wall plates, another use to which the carriage is particularly suited. More particularly, rather than having a lumber end stop in accordance with either of the embodiments of FIGS. 1 – 4 or 5, the embodiment of FIG. 6 includes a marker 76 which is moveable from a raised position illustrated in phantom to a position overlying a plurality of plates as illustrated in solid. Marker 76 includes not only a straight edge provided by an angle iron 77, but also a brace 78 which is connected between the free end of such angle iron 77 and the rearward end of a base angle iron 79. Means are provided for detachably positioning marker 76 on the carriage extending over the fabrication area in a direction normal to the track 11. More particularly, the illustrated carriage 18″ includes upwardly projecting position guides 81 which define the proper location of the marker relative to the carriage.

It will be noted that the positioning guides 81 are also provided on the carriages disclosed in the earlier figures to thereby enable such carriages to be used with a marker 76 to mark plates after removal and thus enable plates to be properly positioned for both cutting and marking via the one carriage. In this connection, the carriage of the embodiment of FIG. 6 is the same as the carriages of the earlier embodiments. Thus, like reference numerals are used to refer to like parts.

To mark plates with the embodiment of FIG. 6, the carriage 18″ is advanced on the track 14 to locations at which the marker 77 is in alignment with the desired indicia on the template to be transferred to the plates. A marking pencil can then be used to transfer such indicia simultaneously to all of the plates with the straight edge of the marker. In this connection, it is desirable to lock the carriage in position during the actual marking operation to assure that slight movements thereof do not result in mismarking. It is for this desired temporary locking that the pressure activated lever 59 is particularly useful. That is, the workman doing the marking need only apply pressure to the actuator 59 with his leg or the like to obtain the desired locking. The workman's hands are thus free for the marking operation, and the carriage is easily freed for movement to the next marking position merely by releasing the pressure on the actuator 59.

The template associated with the present invention is particularly useful for premarking plates with indicia representative of studs, cripples, etc., to be included as part of the wall frame of which they are a part. In this connection, the surface of the template can be marked, such as is shown in FIG. 6 at 82, merely with a pencil or the like. The measurements for the positioning of the template markings can be obtained from the working plans for the construction. Once such markings are applied to a template section of the proper length, the plates for a plurality of wall frames can be marked all at one time by utilizing the apparatus of the invention to transfer such markings from the template section directly to the plates after they are cut.

As another salient feature of the instant invention, the template is provided with additional permanent locator elements which are representative of standard wall module lengths or the like. Such locator elements facilitate transferring data from the plans to the template, for example, as well as being separately useful for both marking the template and representing markings to be transferred to the plates. More particularly, the template sections 37 each includes along its length equally spaced holes 83 representative of such a standard wall module, e.g., 4-foot lengths. Such holes are generally diamond shaped with opposite corners of such diamonds defining lines both axial and transverse of the template. This construction facilitates the accurate alignment of the marker with a hole. More particularly, alignment of the marker 76, for example, with the transversely opposed corners assures that such marker is in alignment with the mid-plane of the mark.

There are some situations in which it is more desirable to utilize a continuous, uncut length of slat to represent a plurality of templates, rather than to cut the slat into sections representative of wall plates and then secure them together in a manner providing the locator holes 39. The modular locator holes 83 facilitates the use of the template in such a continuous manner. More particularly, it will be noted from FIG. 3 that the index projection 47 of the carriage is sized to engage within the locator holes 83, as well as the holes 39. Also, as is illustrated in phantom in FIG. 1, a pin 80 is projectable through an aperture in the abutment plate 41 for engagement within a locator hole 83 to properly position the forward end of a section of the template representing a wall plate. Thus, such locator holes 83 are useable to properly locate the template on the table and the carriage in relation thereto when walls of modular construction length are represented on the template.

It is to be noted that although the locator holes 83 are equally spaced apart to represent standard building modules, they are not successively numbered as would be the case if they represented indicia on a measuring tape. This simplifies construction of template sections of wall plate lengths from a continuous roll of slat material having the spaced locator holes 83, since any one of the holes can be considered as a zero mark from which measurements are to be taken. There are instances, however, when it is desired that direct distance measurements be made relative to plates being formed with the apparatus of the invention. Since the template sections are not practically usable for this purpose, the apparatus also includes a conventional measuring tape. More particularly, with reference to the fabrication area of any one of the embodiments of FIGS. 1, 5 and 6, a conventional measuring tape 84 extends lengthwise of such fabrication area on a shelf 85 adjacent the innerside of flange 17. Most desirably, such measuring tape provides measurements of the distance along the fabrication area from the abutment face of the abutment flange 41 so that any measurement read therefrom will represent the distance from plate ends defined by, or to be defined by, use of saw guide 42.

Figure 7:
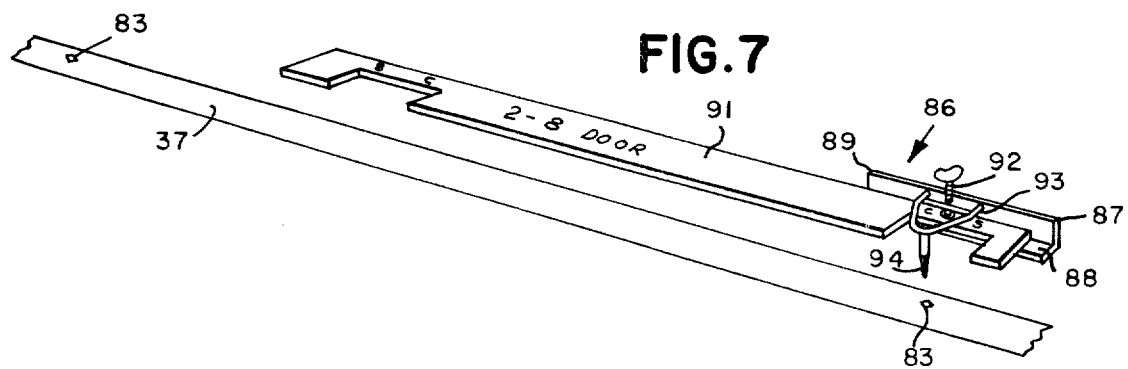
FIG. 7 is a partial isometric and exploded view illustrating the template of the invention associated with an auxiliary indexing mechanism to facilitate marking such template with wall frame indicia.
Figure 8:
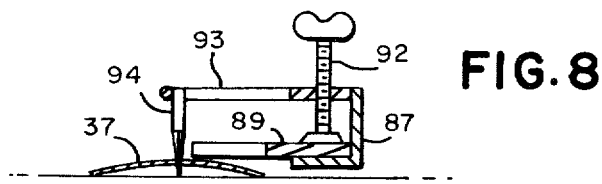
FIG. 8 is an enlarged cross-sectional view taken from FIG. 7 and illustrating the manner in which such auxiliary indexing mechanism cooperates with locator holes on such template.

The provision of the equally spaced locator holes 83 in the template also facilitates the placement of indicia on the template. In this connection, reference is made to FIGS. 7 and 8 which illustrate a marking and index mechanism, generally referred to by the reference numeral 86, especially designed for use with the template. As illustrated, such marking and index mechanism includes an angle iron 87 defining both a shelf 88 and an alignment guide 89 for an auxiliary template 91. Such auxiliary template can be, for example, for marking 16-inch stud spacings on the template or for indicating mark-outs for doors and windows, etc. The auxiliary template 91 is secured in place in the angle iron via a clamp bolt 92.

The marking and index mechanism 86 further includes means for precisely aligning it relative to a template section 37. More particularly, a web 93 cantilevered from angle iron 87 supports a downwardly depending index pointer 94. As illustrated, the lower free end of such index supporter is shaped to register with the holes 83 through the template. The proper door markings or the like can then simply be marked onto the template by suitably fixing the auxiliary template 91 to the indexing mechanism and then engaging the pointer 94 of such indexing mechanism with one of the locator holes 83.

While the invention has been described in connection with preferred embodiments thereof, various changes and modifications will be apparent to those skilled in the art. It is therefore intended that the coverage afforded applicant be defined only by the claims and their equivalent language.

I claim:

1. Frame wall fabrication apparatus comprising: means defining a generally planar fabrication area having a length dimension substantially equal at least to the length dimension of a plurality of wall frames desired for frame walls; a carriage track extending lengthwise of said fabrication area; a lumber end positioning carriage on said track for adjustable positioning along said track lengthwise of said fabrication area, said carriage including a lumber stop projecting over said fabrication area for engagement with the ends of lumber to position the same for the formation of wall plates thereform; a template extendable lengthwise of said fabrication area adjacent said track, said template having a plurality of succeeding sections representative of differing lengths desired for wall plates; and means for separately positioning each of said template sections at a predetermined location lengthwise along said fabrication area, each of said template sections including a mechanical locator element therealong representative of a desired length for a plurality of wall plates, said carriage including indexing means mechanically engageable with said locator elements on said template to position said carriage along said track at locations determined by said template for properly said positions for said lumber stop to engage the ends of lumber pieces to be formed into wall plates, said mechanical locator elements on said template including holes in said template spaced apart therealong the desired length for a plurality of said wall plates, said indexing means of said carriage including a projection which is engageable with said holes to provide said positioning of said carriage along said track at said locations determined by said template, and said template being a thin metal slat and said holes extending therethrough centrally along its length, the central portion of said slat having said holes being bowed outwardly in transverse crosssection to thereby raise said central portion from its side edges.

2. Frame wall fabricating apparatus comprising: means defining a generally planar fabrication area having a length dimension substantially equal at least to the length dimension of a plurality of wall plates desired for frame walls; a carriage track extending lengthwise of said fabrication area; a lumber end positioning carriage on said track for adjustable positioning along said track lengthwise of said fabrication area, said carriage including a lumber stop projecting over said fabrication area for engagement with the ends of lumber to position the same for the formation of wall plates therefrom; a template extendable lengthwise of said fabrication area adjacent said track, said template having a plurality of succeeding sections representative of differing lengths desired for wall plates; and means for separately positioning each of said template sections at a predetermined location lengthwise along said fabrication area, each of said template sections including a mechanical locator element therealong representative of a desired length for a plurality of wall plates, said carriage including indexing means mechanically engageable with said locator elements on said template to position said carriage along said track at locations determined by said template for properly fixing positions for said lumber stop to engage the ends of lumber pieces to be formed into wall plates, said mechanical locator elements on said template including holes in said template spaced apart therealong the desired length for a plurality of said wall plates, said indexing means of said carriage including a projection which is engageable with said holes to provide said positioning of said carriage along said track at said locations determined by said template, said template including a plurality of pairs of said locator holes along its length, the spacing between each pair of holes being different than between other pairs thereof and representing one of said sections providing a desired length for a plurality of wall frame plates, and said template being flexible along its length; and wherein spools about which said template is coilable are provided at opposite ends of said fabrication area for holding and feeding said template across said fabrication area for the successive location on said fabrication area of differing pairs of said locator holes.

3. Frame wall fabricating apparatus comprising: means defining a generally planar fabrication area having a length dimension substantially equal at least to the length dimension of a plurality of wall plates desired for frame walls; a carriage track extending lengthwise of said fabrication area; a lumber end positioning carriage on said track for adjustable positioning along said track lengthwise of said fabrication area, said carriage including a lumber stop projecting over said fabrication area for engagement with the ends of lumber to position the same for the formation of wall plates therefrom; a template extendable lengthwise of said fabrication area adjacent said track, said template having a plurality of succeeding sections representative of differing lengths desired for wall plates; means for separately positioning each of said template sections at a predetermined location lengthwise along said fabrication area, each of said template sections including a mechanical locator element therealong representative of a desired length for a plurality of wall plates, said carriage including indexing means mechanically engageable with said locator elements on said template to position said carriage along said track at locations determined by said template for properly fixing positions for said lumber stop to engage the ends of lumber pieces to be formed into wall plates; and means for selectively adjusting the location of said lumber stop lengthwise of said fabrication area relative to said carriage accommodating the formation of an additional wall plates having a desired length associated with the wall plate lengths represented by said template, said lumber stop including a pair of sections which are adjustable with respect to one another lengthwise of said fabrication area to enable the simultaneous fabrication of wall plates of the length indicated by said template and wall plates of an additional, associated length.

4. A template for a wall fabrication apparatus comprising an elongated, thin metal slat which is flexible lengthwise for coiling and includes a curvature in its transverse cross-section for raising the center section thereof above any flat surface engaged by its longitudinal edges and for resisting coiling when said slat is in a flat condition; said template having first and second sets of holes extending therethrough centrally along its length, said first set of holes being equally spaced from one another a distance representative of a standard wall module and the spacing between each pair of holes of said second set being different than between other pairs thereof and representing a desired length for a plurality of wall frame plates.

5. The template of claim 10 further in combination with a wall frame fabrication apparatus including means defining a generally planar fabricating area having a length dimension substantially equal at least to the length dimension desired for wall plates, said template extending lengthwise across said fabrication area, and wherein spools are provided at opposite ends of said fabrication area about which opposite ends of said template are coiled for holding and feeding said template across said fabrication area for the successive location on said fabrication area of differing sections of said template.

6. Frame wall fabricating apparatus comprising means defining a generally planar fabrication area having a length dimension substantially equal at least to the length dimension desired for frame wall plates, a carriage track extending lengthwise of said fabrication area; and a lumber end positioning carriage on said track for adjustable positioning along said track lengthwise of said fabrication area, said lumber end positioning carriage including a lumber stop projecting over said fabrication area for engagement with the ends of lumber to position the same for the formation of wall plates therefrom, said lumber stop including a pair of sections which are adjustable with respect to one another lengthwise of said fabrication area to enable the simultaneous fabrication of wall plates of the length indicated by said template and wall plates of another, associated length.

7. The frame wall fabricating apparatus of claim 6 further including a template extending lengthwise of said fabrication area adjacent said track, said template having locator holes spaced apart lengthwise thereof distances representative of desired lengths for pluralities of wall plates, and said carriage includes an indexing projection which is engageable within said holes to position said carriage along said track at locations determined by said template for properly fixing positions for the end of lumber pieces to be made into wall plates; and wherein said template is flexible along its length and spools are provided at opposite ends of said fabrication area about which opposite end portions of said template are respectively coiled for holding and feeding said template across said fabrication area for the successive location on said fabrication area of differing desired lengths for wall plates.

* * * * *